No. 864,200.
PATENTED AUG. 27, 1907.
M. SHELTON.
AUTOMATIC GAME TRAP.
APPLICATION FILED NOV. 21, 1905.
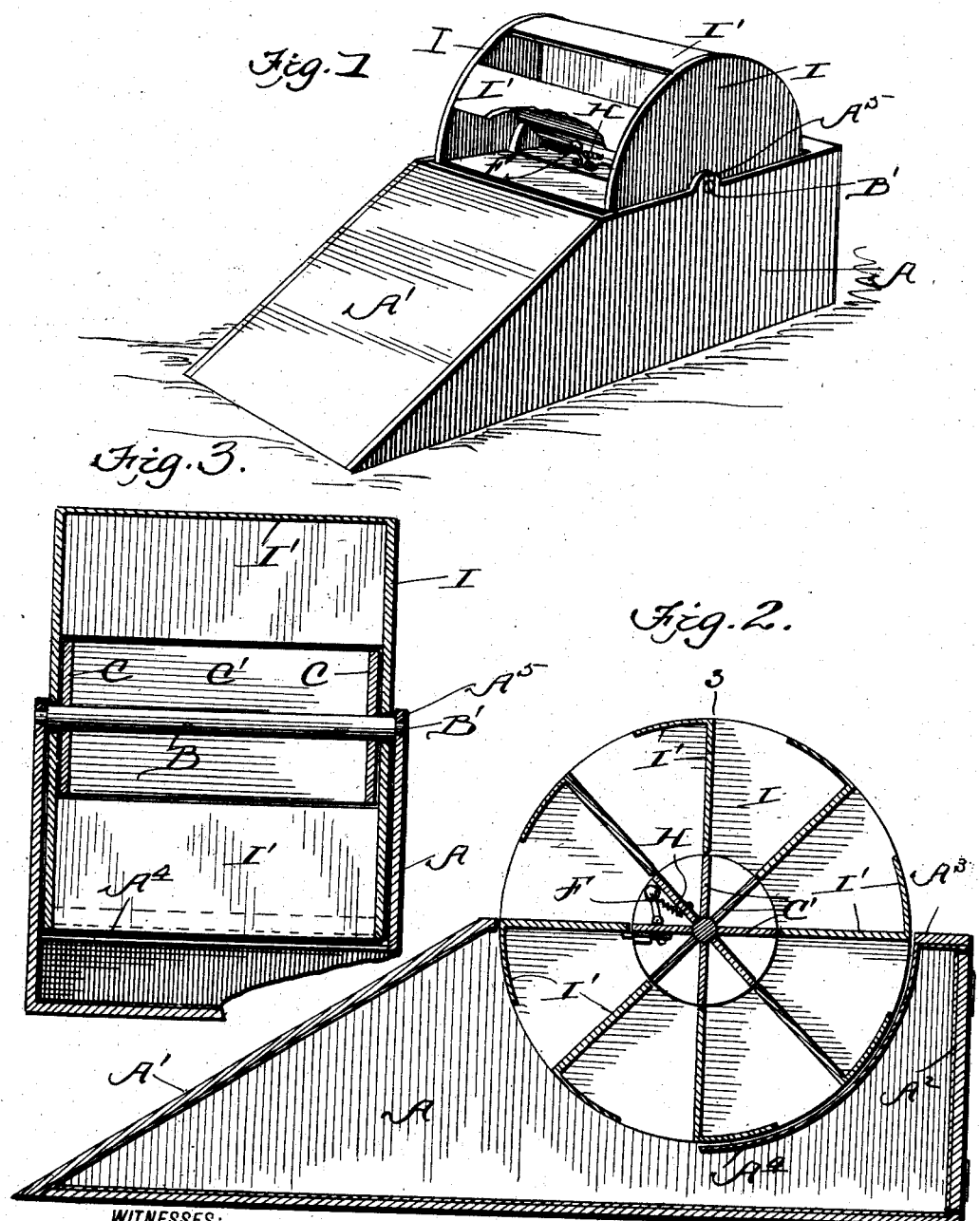

# UNITED STATES PATENT OFFICE.

MARK SHELTON, OF NEIER, MISSOURI, ASSIGNOR OF ONE-THIRD TO L. SPRINKER AND JACOB T. STEIGLE, OF ST. LOUIS, MISSOURI.

AUTOMATIC GAME-TRAP.

No. 864,200.   Specification of Letters Patent.   Patented Aug. 27, 1907.

Application filed November 21, 1905. Serial No. 288,412.

*To all whom it may concern:*

Be it known that I, MARK SHELTON, a citizen of the United States, residing at Neier, in the county of Franklin and State of Missouri, have invented a new and useful Automatic Game-Trap, of which the following is a specification.

My invention relates to certain new and useful improvements in automatic game traps, and has for its object to provide a trap that is very simple and cheap in construction and one that is very effective in use.

Another object of my invention is to provide a trap so constructed that it will always be set, and one that will set itself after an animal has been trapped, so it will be ready for another.

A further object of my invention is to provide a trap so constructed that the bait will last indefinitely, as it is almost impossible for the animal to secure the same.

A further object of my invention is to provide a tripping means so constructed that the least pull on the bait will cause the plate to drop with the animal and trap the same.

With these objects in view, the invention consists of the novel features of construction, combination and arrangement of parts, hereinafter fully described and pointed out in the claims.

Figure 1 is a perspective view of the trap. Fig. 2 is a longitudinal sectional view of the trap. Fig. 3 is a cross-section of the same. Fig. 4 is a detail view of the tripping means.

Referring to the drawing, A, indicates an open top box, which may be made of any material desired and is provided with an inclined side A', forming a runway for the purpose hereinafter described. The box is provided with a door A², adjacent the other end and an inwardly extending flange A³, having a curved downwardly extending plate A⁴. Extending up from each side of the box are perforated lugs A⁵, in which the reduced ends B', of the shaft B, are secured.

Rigidly secured to the shaft adjacent each end, is a disk C, connected together by plates C', which extend inwardly and bear against the shaft B. Two of these plates are arranged on the line with the top of the box, and to the underside of the plate, adjacent the inclined side I secure a guide-plate D, in which is mounted a bolt E, provided with a slot E', formed adjacent its inner end. The plate is provided with an opening C², and on the upper side of the plate adjacent the opening, a bracket F', is secured to which an arm F, is pivoted, on the upper end of which the bait is adapted to be secured. The lower end extends down through the opening, into the slot of the bolt. A perforated lug F², is formed on the arm adjacent the upper end, and carries a coil-spring H, the other end of which is connected to an adjacent plate by a bolt H', and has the tendency to pull the arm inwardly, and shove the bolt outwardly, for the purpose hereinafter described.

Loosely mounted on the shaft B, on the outside of the disk C, are disks I, of a larger diameter than the disk C, and are connected together by angle plates I', which extend inwardly and are adapted to register with the plates C', and the disk C, and to be locked in that position by the bolt E.

The operation is as follows: The trap is set as shown in Figs. 1 and 2, and it can be readily seen that the inclined side will form means for the animal to pass up on the plate held in a line with the top, and if he pulls on the bait, he will pull the bolt from under the plate on which he stands and it will drop by his own weight and he will be thrown into the box below, where it is impossible to get out of, as the curved plate prevents him from going out of the other side.

Having thus fully described my invention what I claim as new and desire to secure by Letters Patent is:—

1. In a trap, the combination with a box provided with stationary plates, of plates adapted to rotate around said plates, and means for locking said plates in alinement with each other, for the purpose described.

2. In a trap, the combination with a box provided with a shaft arranged therein, disks secured on said shaft connected together by plates, of loosely mounted disks arranged on each side of said disks, connected together by plates and means carried by the rigid plates for locking the rotatable plates in alinement with each other, for the purpose described.

3. In a trap, the combination with a box provided with an inclined side and an inwardly curved plate, of a shaft mounted in said box, disks secured on said shaft, plates connecting said disks, disks of a greater diameter loosely mounted on said shaft connected together by angle-plates, and a slidable bolt carried by the plates of the rigid disks, adapted to engage the plates of the rotatable disks, for the purpose described.

4. In a trap, the combination with a box, provided with an inclined side and an inwardly curved plate, lugs formed on the upper edge of the sides, of a shaft rigidly secured in said jug, disks rigidly secured on said shaft and connected together by plates, an opening formed in one of the plates, a bolt secured adjacent said opening, an arm connected to said bolt and extending up through said opening, and disks of a larger diameter loosely mounted on the shaft, adjacent the side of the box, and connected together by angle plates, for the purpose described.

5. In a trap, the combination with a box provided with an inclined side, a shaft mounted in said box, disks secured on said shaft, plates connecting said disks, disks of a larger diameter loosely mounted on said shaft and connected by angle plates, and spring-actuated locking means carried by one of the plates of the rigid disks, for the purpose described.

MARK SHELTON.

Witnesses:
LOUIS MAX,
HERMAN H. HEIDBRINK.